United States Patent [19]

Sharp et al.

[11] Patent Number: 5,317,442
[45] Date of Patent: May 31, 1994

[54] MUTUALLY PUMPED PHASE CONJUGATOR FOR REMOTE IDENTIFICATION

[75] Inventors: Edward J. Sharp, Fredericksburg; Gary L. Wood, Centreville; William W. Clark, III, Lorton, all of Va.; Gregory J. Salamo, Fayetteville, Ark.

[73] Assignee: The United States of America as represented by the Secretary of the Army, Washington, D.C.

[21] Appl. No.: 98,999

[22] Filed: Jul. 29, 1993

[51] Int. Cl.⁵ .............................................. H04B 10/00
[52] U.S. Cl. .................................. 359/170; 359/159; 359/160; 359/152; 342/45
[58] Field of Search ............... 359/143, 152, 159, 160, 359/169–170; 342/45

[56] References Cited

U.S. PATENT DOCUMENTS

| | | | |
|---|---|---|---|
| 3,989,942 | 11/1976 | Waddoups | 359/170 |
| 4,099,050 | 7/1978 | Sauermann | 359/169 |
| 4,763,361 | 8/1988 | Honeycutt et al. | 359/170 |
| 4,767,195 | 8/1988 | Pepper | 359/276 |
| 5,001,488 | 3/1991 | Joguet | 359/143 |

Primary Examiner—Richard E. Chilcot, Jr.
Assistant Examiner—Kinfe-Michael Negash
Attorney, Agent, or Firm—Alain L. Bashore; Milton W. Lee; Anthony T. Lane

[57] ABSTRACT

A universal IFF technique and system utilizes a real-time communication link established between both parties allowing the approximate immediate transferral of digital information with positive direction and identification of both parties achieved. A pump laser emits a first signal at a first position and a remote laser beacon emits a second signal at a second position, both signals at nominally the same wavelength. A MPPCM receives the first signal which establishes a beam fan. The MPPCM and first signal scans about a region of interest to intercept the second signal. The second signal provides a second input signal into the MPPCM so that a two-way phase conjugation signal builds up and lock-on is established.

8 Claims, 6 Drawing Sheets

MUTUALLY PUMPED PHASE CONJUGATOR FOR REMOTE IDENTIFICATION

BACKGROUND OF THE INVENTION

1. Field of the Invention

The present invention generally relates to remote optical sensing and more specifically, to a mutually pumped phase conjugator remote optical sensing technique and system utilized as a real time communications link for Identification of Friend or Foe (IFF).

2. Description of Prior Art

The diverse deployment of highly sophisticated weapon systems by numerous participants on the modern battlefield can pose a problem not only to battlefield tactics but also to friendly forces in battlefield engagements. Digital signals permit the integration of speech, data, pictures, or any other information in a universal communications format. A real-time communication link which cannot be easily countermeasured is crucial to battlefield success. This fact has led to a greater dependence on updated information only available through digital information transmission.

A communications link is especially crucial in preventing accidental engagement of friendly forces on the battlefield which creates tremendous morale problems and reduces the overall effectiveness of any engagement. In the area of IFF it is essential to positively identify friendly forces quickly and accurately with absolute assurance in order to effectively engage unfriendly forces. The uncertainty in the identification of forces on the battlefield and subsequent hesitation in engagements can lead to an ineffective encounter (fratricide in the worst case). Some of the problems, past solutions and their defects in IFF can be described in the context of engagements that occurred during Desert Storm.

In Desert Storm, ranges of 2-4 km for tank engagements and as much as 8 km for some guided munitions reduced the target seen by the soldier to a "blob". The desert terrain presents an uncluttered extended view, with few visual spatial cues, and no natural places of concealment. Flags, inverted Vee and other identifying symbols fabricated using paint/tape, and orange panels were placed on vehicles to aid in daylight visual recognition. Heavy overcast days, smoke, and nighttime encounters led to the aforementioned solutions as being unusable, and also could easily be countermeasured since special equipment was not required to determine the presence of such measures. Numerous nighttime engagements required use of infrared imaging devices which also suffered from problems due to the surroundings.

Thermal terrain images in the Dessert differ from more temperate terrains because of low thermal scene contrast and large target contrast swings due to diurnal cycles which make thermal imaging difficult. Temperature cycles as large as 70 degree F. occur from day to night. When gain/contrast controls of thermal imaging devices are set to maximize brightness, recognition cues are severely reduced. Temporary solutions, such as pulsing near IR beacons were utilized on vehicles but was not appropriate for a longer conflict since the enemy also had limited night vision devices. These types of solutions have a fixed recognition which cannot be readily updated, and allow for a less complicated countermeasure to be designed since each party requires only a transmitter or a receiver.

While the prior art has reported using IFF systems and techniques none have established a basis for a specific apparatus that is dedicated to the task of resolving the particular problem at hand. What is needed in this instance is a universal IFF apparatus and technique which includes: wavelengths utilized not in the visible spectrum, recognition requirements that can be continually updated, requires transmitting and receiving devices for both parties (universal) which must be nominally of the same wavelength allows for the immediate transferral of digital information between both parties, and not substantially dependent on environmental conditions.

SUMMARY OF THE INVENTION

It is therefore the primary object of the invention to provide a universal IFF system and technique utilizing a real-time optical communications link established between two distinct positions allowing for the approximately immediate transferral of digital information with positive locational direction and identification of both distinct positions and recognition requirements that can be continually updated.

According to the invention, there is disclosed a universal IFF technique and system utilizes a real-time communication link established between both parties allowing the approximate immediate transferral of digital information with positive direction and identification of both parties achieved. A first signal is emitted and modulated which is imputed into a mutually pumped phase conjugation mirror (MPPCM) at a first position which establishes a beam fan within the MPPCM to emit the first signal. The MPPCM and first signal scans about a region of interest to intercept a second signal from a remote laser beacon at a second position. The second signal is detected by a first detecting means such that the second signal provides a second input signal into the MPPCM so that a two-way phase conjugation signal is established and lock-on is effected.

The modulation code can be updated or changed daily, in a predetermined sequence. Modulation of laser beams can be accomplished via mechanical, acousto optic, electro-optic, or magneto-optic techniques. The information carried on the laser beam signal can be updated as frequently as wanted or needed by simply changing the modulation pattern of the voltage applied to those optical modulators utilizing voltage. In this way the amplitude, time between pulses and pulse width of the laser beam can be changed (modulated) so as to prevent access by noncooperative participants.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
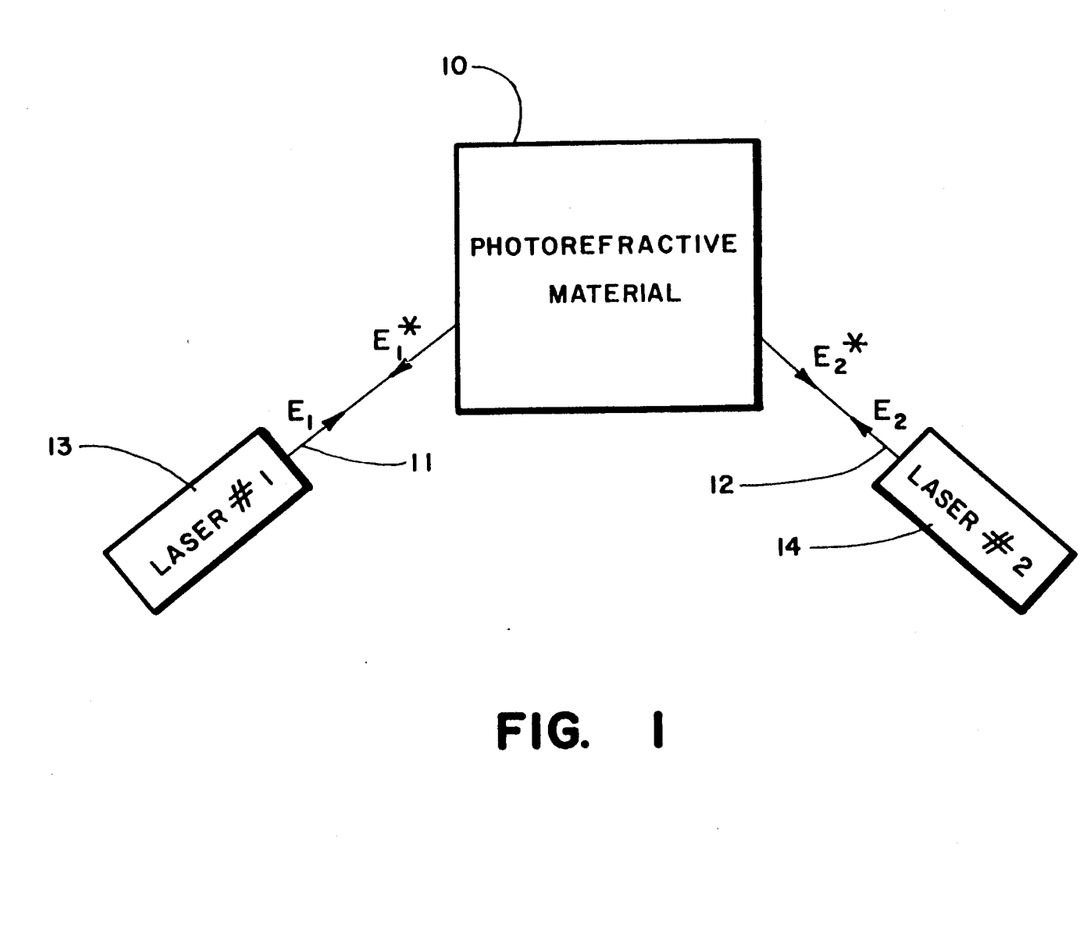
FIG. 1 is a schematic of the general concept of mutually pumped phase conjugation.

Referring now to the drawings, and more particularly to FIG. 1, there is shown a schematic of the general concept of a class of photoreactive phase conjugators called mutually pumped (or double-pumped) phase conjugation mirrors (MPPCM). The present invention takes advantage of the ability of certain photorefractive media to record "semi-permanent" real-time holograms with high diffraction efficiencies. Photorefractive material 10 acts as a phase conjugate mirror for two incoming waves simultaneously. Material 10 is a photorefractive crystal such as barium titanate ($BaTiO_3$) or tungsten bronze structure crystals: strontium barium niobate (SBN) or barium strontium potassium sodium niobate (BSKNN). Output 11 and 12 from independent lasers 13 and 14 respectively, generate incident optical electromagnetic fields $E_1$ and $E_2$ as shown in FIG. 1. When outputs 11 and 12 are directed into photorefractive medium 10, a phase conjugate replica, designated $E_1^*$ and $E_2^*$ respectively, of each beam appears under appropriate conditions. The conjugation of the two beams occur simultaneously, and may be derived from mutually incoherent lasers.

Both output beams 11 and 12 are required for either conjugate to exist and the energy for the conjugate of one beam is supplied by the other beam. If $E_1$ is blocked, the conjugate $E_2^*$ disappears instantly, while the conjugate $E_1^*$ disappears with the characteristic erasure time of a photorefractive hologram in the particular photorefractive material. A similar behavior is observed if $E_2$ is blocked. In this conjugator, beam 11 writes the gratings responsible for the production of its conjugate while beam 12 reads these gratings and supplies the energy for the conjugate wave. These features provide the means whereby the conjugate output can be modulated by the opposite input beam. The conjugate signal $E_1^*$ is therefore controlled with $E_2$ and vice-versa. Substantially no cross talk is observed between conjugating beams and digital information can be immediately transferred between beams. Images can be conjugated with excellent fidelity, also subtraction and addition of images can be performed. A more complete description of MPPCMs may be found in "Double phase conjugation in tungsten bronze crystals" by Edward J. Sharp et al; APPLIED OPTICS; Vol. 29, No. 6; 20 Feb. 1990; pages 743-749.

Figure 2:
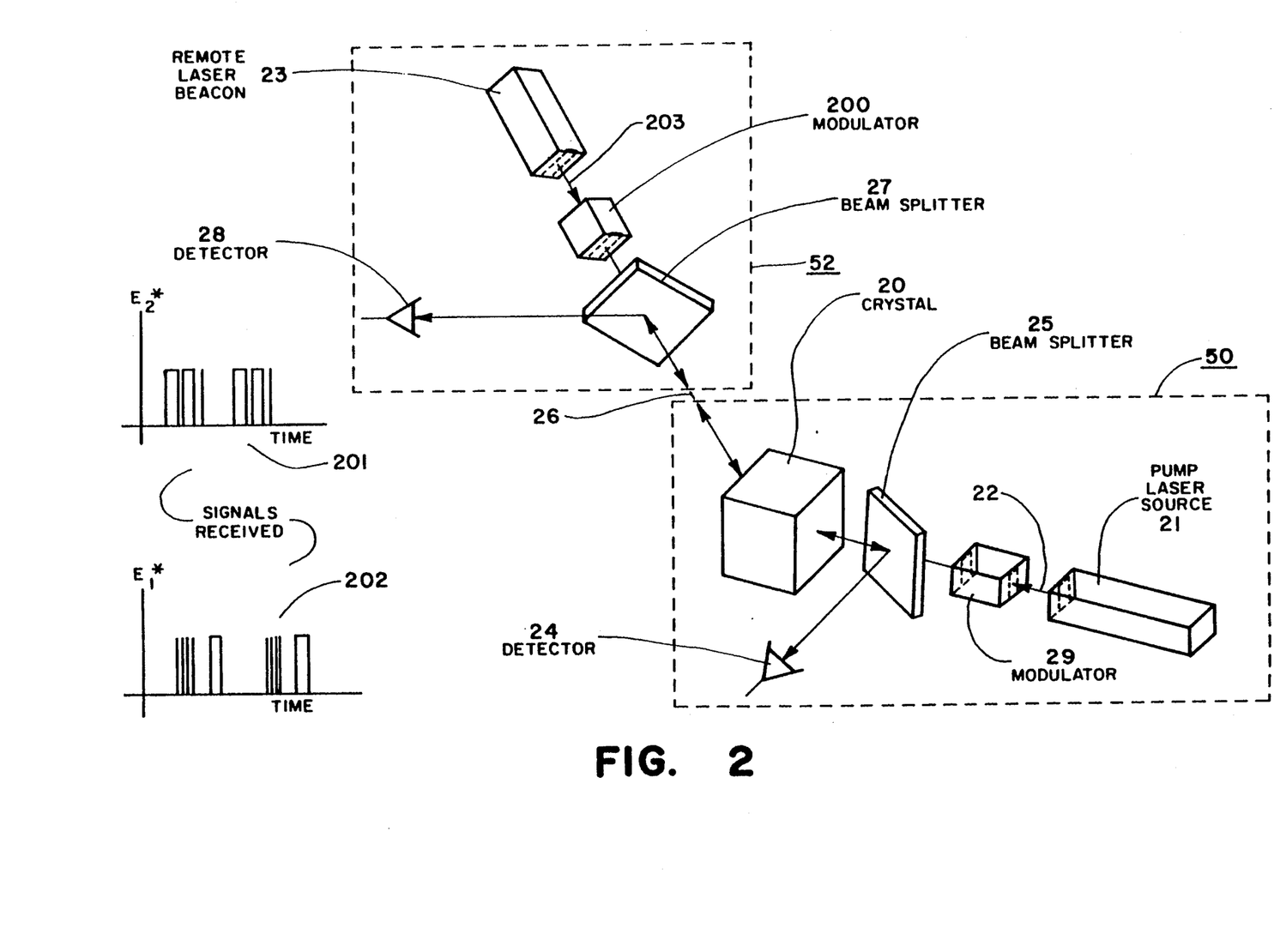
FIG. 2 is a schematic of the universal IFF system.

FIG. 2 is a schematic of the universal IFF and communication device of the preferred embodiment. Pump laser source 21 at a first position is used to provide pump beam 22 as an input beam to establish a beam fan in crystal 20. It is understood that any other suitable laser source may be used for laser 21 but in the preferred embodiment a dedicated thermally tuned diode laser is utilized. Crystal 20 of the preferred embodiment is a crystal of SBN:60 which has a field of view (FOV) of 50 degrees by 30 degrees relative to pump beam 22 so the device only needs to be scanned through four sweeps of 120 degrees to completely cover $2\pi$ steradians. A signal from remote laser beacon 23 at a second position provides another output beam 203 that is detected at detector 24 via beam spitter 25 after which two-way phase conjugation beam 26 builds up and lock-on is established. In order for detector 24 to record a phase conjugate signal there must be another laser entering the crystal to supply the energy for the signal and simultaneously the other beam is being phase conjugated by pumping beam 22. Pump laser 21 and remote laser beacon 23 are modulated by modulators 29 and 200 respectively. It is understood that either one or both sources may be modulated and that the modulators may be separate modules or be within respective laser cavities of pump laser 21 or laser beacon 23. Onboard detector 24 via beam spitter 25 and remote detector 28 via beam spitter 27 will then receive modulated conjugated signals. These signals, shown in FIG. 2 as received signals 201 and 202 are then used to tell each party their identity. The optical modulator device used for laser beam modulation is next described.

The function of the optical modulator is to impress information on either or both input laser beams. The modulator must have the ability to vary the light wave at high speeds in a controllable manner. This is accomplished, for example, by changes in: amplitude, polarization, propagation direction (beam deflection), or frequency of the light beam in a manner related to the signal to be transmitted. The modulation code on either beam can be updated or changed daily, in a predetermined sequence. Modulation of laser beams can be accomplished via mechanical, acousto-optic, electro-optic, or magneto-optic techniques. The information carried on the laser beam signal can be updated as frequently as wanted or needed by simply changing the modulation pattern of the voltage applied to those optical modulators utilizing voltage. In this way the amplitude, time between pulses and pulse width of the laser beam can be changed (modulated).

Figure 3:
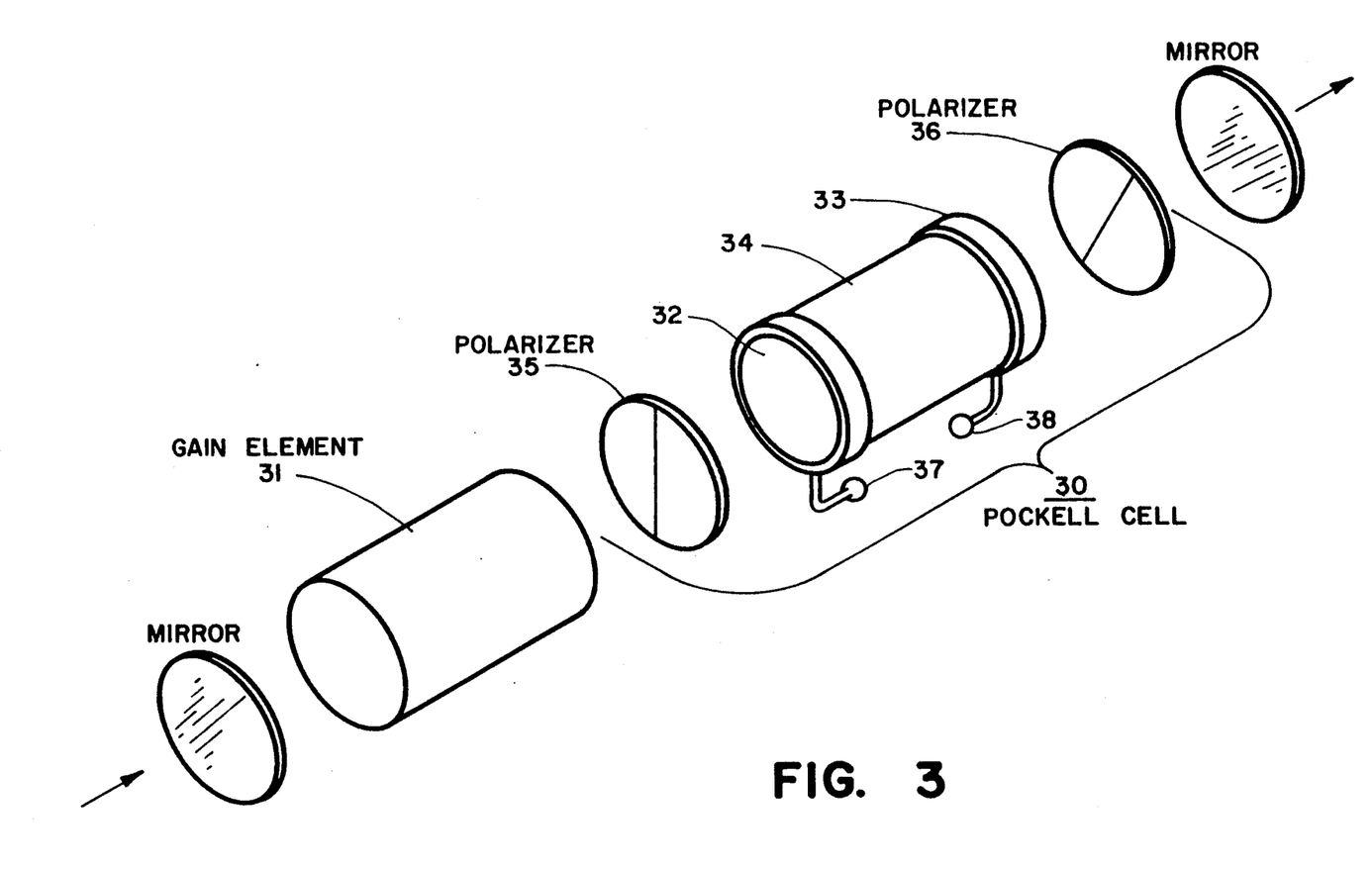
FIG. 3 is a pictorial representation of the optical modulation components utilized in the preferred embodiment.

FIG. 3 is a schematic diagram of the electro-optic modulation device and gain components utilized within the laser cavity of the preferred embodiment of the invention. Optical modulator device 30 and gain element 31 shown in FIG. 3 are contained within the laser cavity instead of as separate elements as shown in FIG. 2. It is understood that optical modulators and gain elements may be in separate modules or contained in a single module. Optical modulator device 30 is a Pockell cell utilizing the Pockels effect which includes transparent electrodes 32 and 33 on either end of crystal 34, all of which is in between polarizers 35 and 36. The polarization state of the laser beam is altered by the application of a modulating voltage across the medium of crystal 43 at terminals 37 and 38. Response time for device 30 is less than 10 nanoseconds (ns) and can modulate the light beam up to about 25 GHz. A modulating voltage causes the cell to act as a variable waveplate and results in a modulated output. Crystal 34 in the preferred embodiment is either a crystal of ADP or KDP. The pattern impressed on the modulation voltage determines the pattern or sequence of the information transmitted.

Figure 4A:
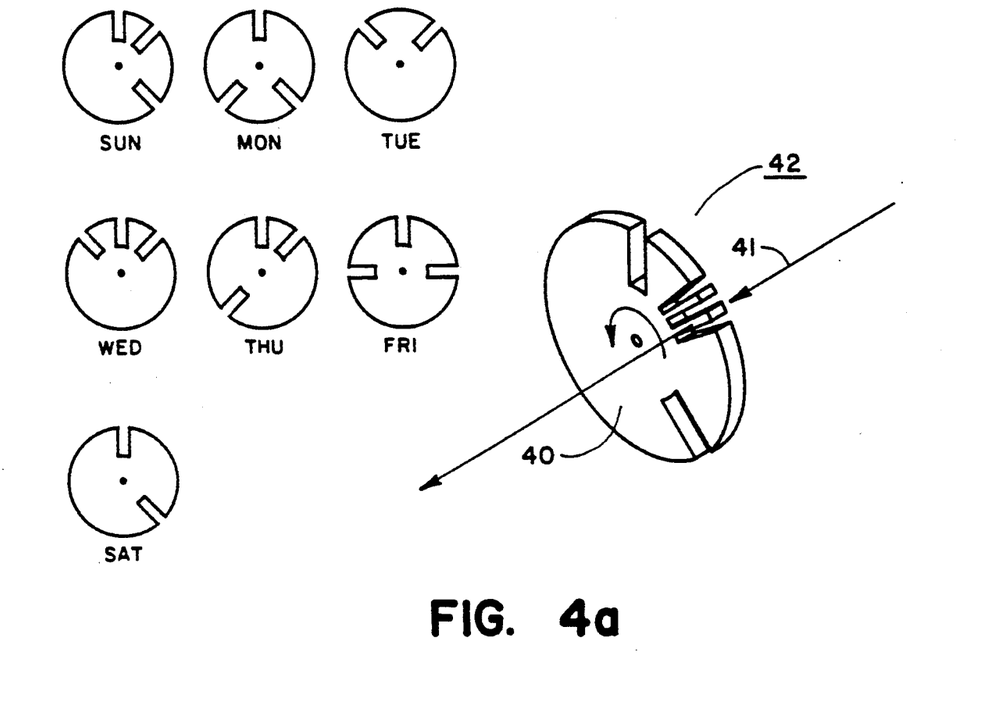
FIGS. 4a through 4d are pictorial representations of optical modulators utilized in alternative preferred embodiments.

FIGS. 4a through 4d are pictorial representations of optical modulators utilized in alternative preferred embodiments. FIG. 4a shows a mechanical alternative embodiment utilizing toothed wheel 40 which rotate in either direction in the path of laser beam 41 such that the amplitude of the laser beam is modulated. Adjustable parameters are the rotation speed of toothed wheel 40 and the pattern of slits 42 in wheel 40. A different pattern or wheel for each day, labeled Sunday through Saturday may be used as shown in FIG. 4a.

Figure 4B:
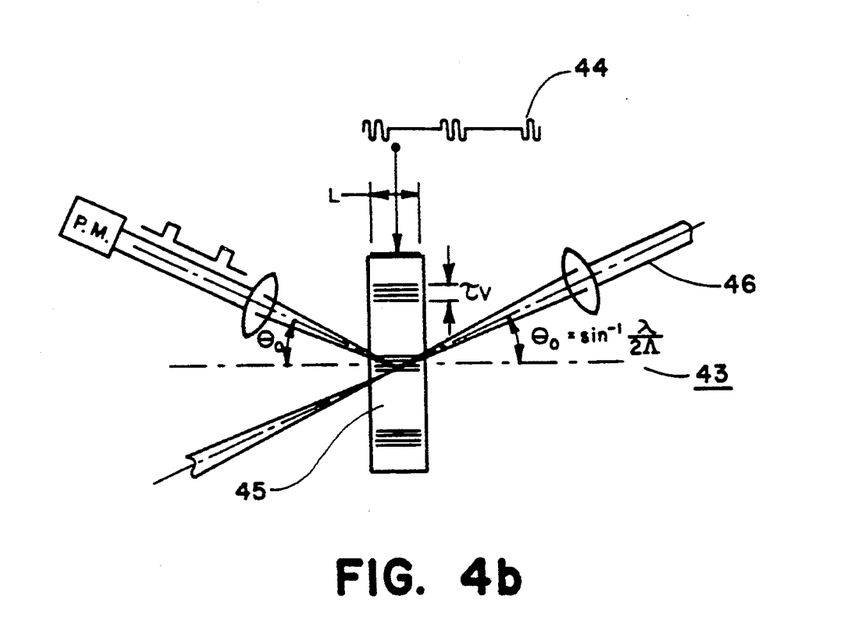

FIG. 4b shows an acoustooptic alternative embodiment utilizing pulsed acoustooptic modulator 43 used to carry out optical modulation, switching, random access or sequential deflection. RF pulses 44 are applied to single plane transducer 45 such that there is a deflection of incident optical energy 46 proportional to and which varies with RF pulses 44. In this alternative embodiment, a PbMoO$_4$ defector operates from 90 to 170 MHz defects more than 50% of the incident optical energy in a 514 nanometer (nm) Argon ion laser beam. This magnitude of modulation would be easily detected in the phase conjugate outputs of MPPCM crystal 20 of FIG. 2.

Figure 4C:
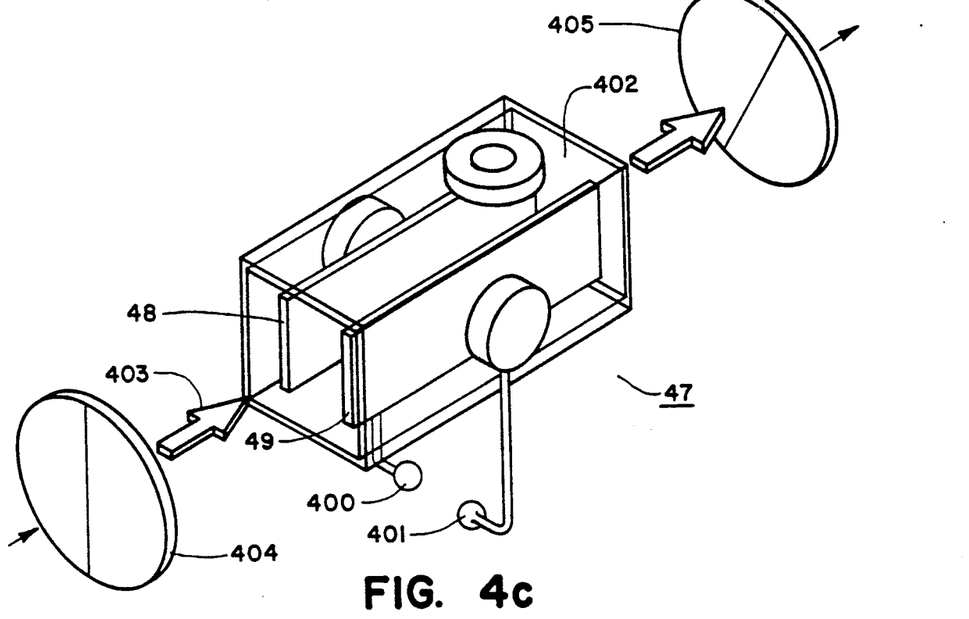

FIG. 4c shows an electro-optic alternative embodiment utilizing a Kerr Modulator Cell 47 which uses the quadratic electro-optic or Kerr effect. Cell 47 includes plate electrodes 48 and 49 of which is applied a modulating voltage at terminals 400 and 401. Medium 402 is situated within cell 47 such that a modulated voltage causes the cell 47 to act as a variable waveplate and result in a modulated output for the laser light 403 which travels in between plate 48 and 49. The preferred alternative embodiment consists of a cell containing nitrobenzene or carbon disulfide placed between crossed linear polarizers (+ or −45 degrees) 404 and 405. Cell 47 is used as laser-Q switches and high speed optical modulators (as high as $10^{10}$ Hz).

Figure 4D:
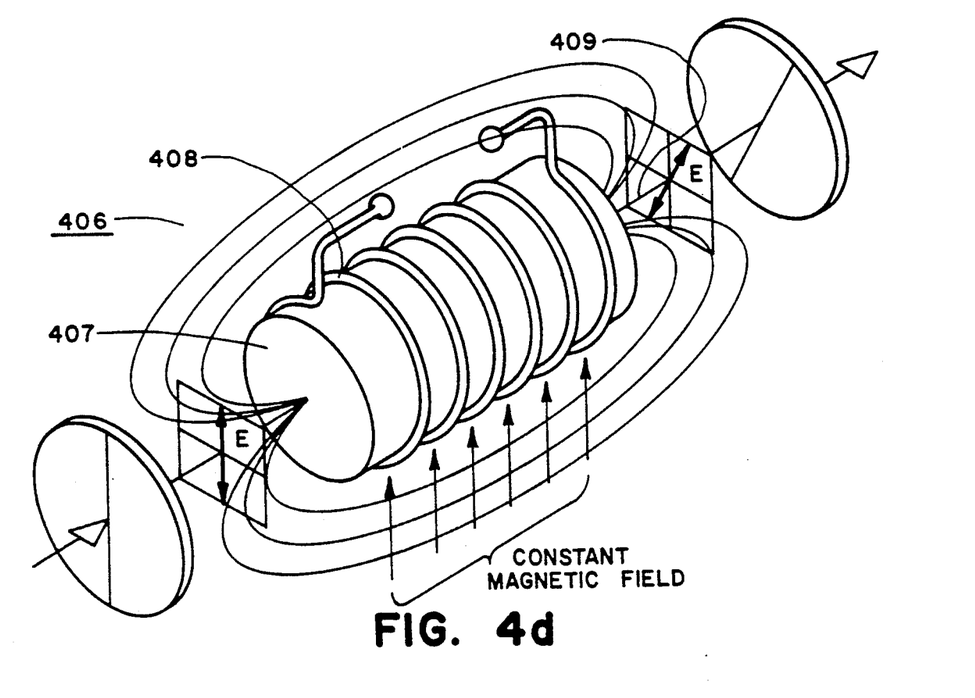

FIG. 4d shows a magneto-optic alternative embodiment utilizing a Faraday Effect Modulator 406. Modulator 406 consists of a magnetic crystal 407 saturated by constant transverse magnetic field whose direction is varied in proportion to a modulating current induced in coil 408 surrounding crystal 407. The signal to be transmitted is introduced across coil 408 as a modulating voltage and emerging laser beam 409 carries that information in the form of amplitude variations.

Figure 5:
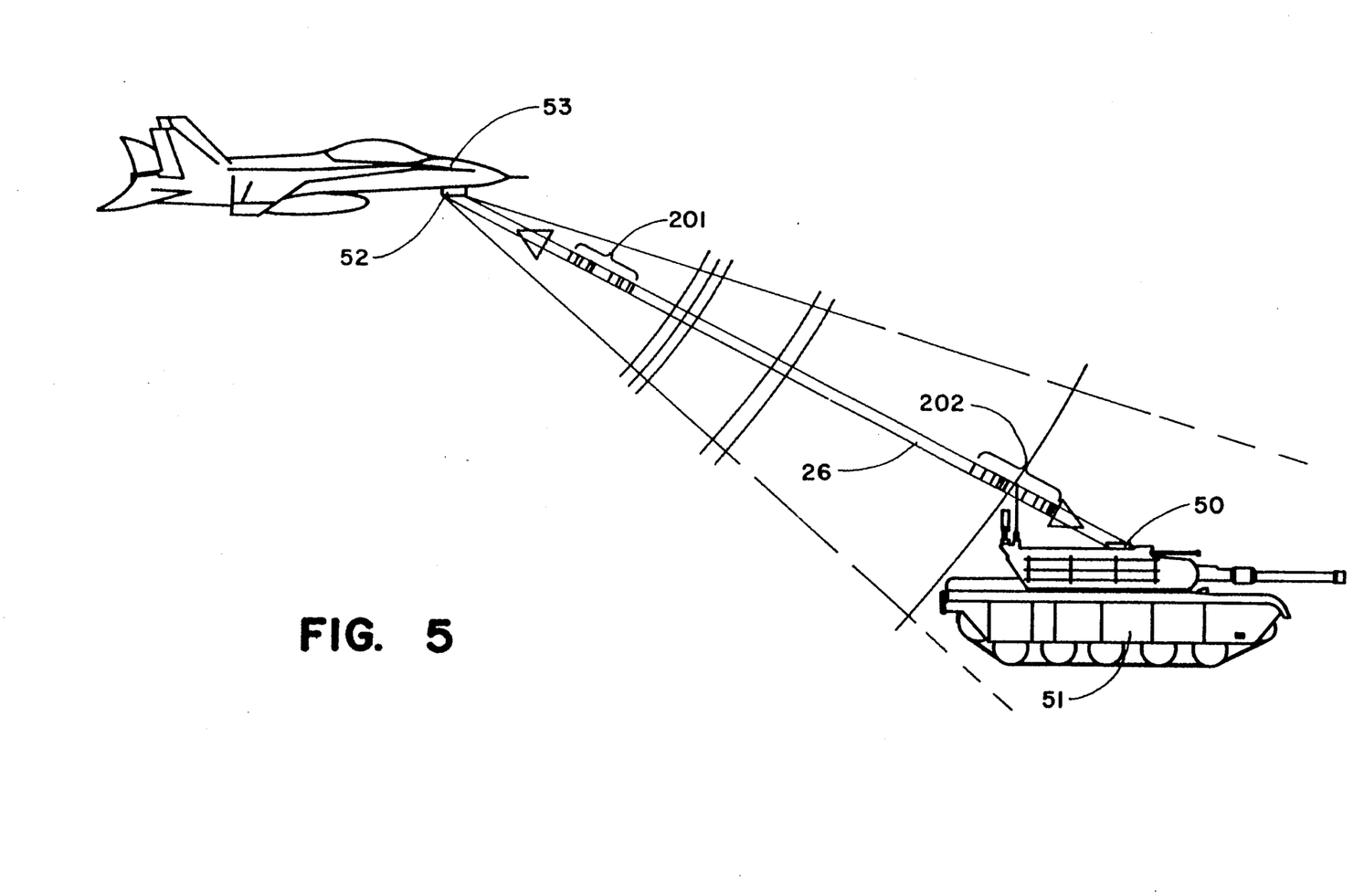
FIG. 5 is a pictorial representation of the preferred embodiment utilizing what is shown in FIG. 2.

FIG. 5 is a pictorial representation of the preferred embodiment utilizing the device and technique described in FIG. 2. In the arrangement shown pictorially in FIG. 5, electronics package 50 which is mounted on tank 51 includes the pumped laser 21, crystal 20, beam spitter 25, optional modulator 29, means to allow crystal 20 to scan (not shown), and detector 24 as shown in FIG. 2. Electronics package 52 of FIG. 5 also shown in FIG. 2, which is mounted on aircraft 53 and includes a laser beacon 23, a beam spitter 27, an optional modulator 200 and a detector 28. After a beam fan is generated with laser pump 21 within material 20, scanning of crystal 20 and pumped laser 21 occurs so as to intercept any laser beacons of similar wavelength and lock-on. It is understood that the laser beacon 23 may be omnidirectional or limited to a specific predetermined pattern. After a conjugate signal is established, digital information can be immediately transferred from one beam to the other in either direction. Each end of the newly formed optical communication link can act as a transceiver, both sending and receiving information simultaneously.

The device will scan in a regular pattern determined by the FOV of the MPPCM until a signal is received, at which point the signals lock on and are read to determine if the proper code is being received. The means to allow the MPPCM and pumped laser to scan a predetermined field of view (not shown) may comprise any technique well known in the prior art. This scanning result can be used to give the approximate direction of the signal. Since pumped crystal 20 of FIG. 2 has an approximate FOV of 50 degrees by 30 degrees, the entire crystal and its pump laser must be scanning in a manner to completely cover any region of interest. When mounted on a tank, and engaged in ground conflict, it would be scanned at ground level in a 360 degree circular pattern. With this technique beacons from any other source would be intercepted and record a signal which would be used to stop the scan and allow lock on.

Lock on is established when discernable phase conjugate signals are recorded. At this point in time either or both of the input beams can be modulated in any number of ways previously disclosed. Information then could be exchanged to reveal the exact identity of the two sources. As an alternative technique, the tank scans the sky just above the horizon for low flying aircraft such as helicopters. In either technique the system can cover the entire $2\pi$ steradian field of view (FOV) in four scans of 120 degrees. The scan pattern can be selected depending on the nature of the particular engagement or be continuously scanned to locate the beacons from any source.

Transmitted information can be any sequence or series of amplitude and/or frequency modulated laser light. For example, two short pulses of light of equal amplitude separated in time by 20 ns followed 20 ns later by a single long pulse with twice the amplitude of the first two pulses might be assigned the name "U.S. Army". This simple message can be transmitted every second for example.

The IFF system and technique provides unique characteristics which allow this system to be difficult to countermeasure. The wavelengths of preference are not in the visible spectrum, so detectors are required to determine their presence and wavelength. Either or both modulation codes can be changed daily or as often as necessary and this could be done automatically. The instant invention is also not substantially dependent on environmental conditions. If one receives a signal they know they are being interrogated by either friend or foe. The particular temporal modulation used provides a unique signature of the respective lasers. The instant invention makes use of these capabilities to provide two-way remote optical sensing for the purpose of locating and identifying friendly forces.

While this invention has been described in terms of preferred embodiment consisting of a system and technique and system for IFF, those skilled in the art will recognize that the invention can be practiced with modification within the spirit and scope of the appended claims.

Having thus described my invention, what We claim as new and desire to secure by Letters Patent is as follows:

1. A universal identification of friend or foe (IFF) method utilizing a real time communications link between two distinct positions to establish positive identification comprising the steps of:
  providing a first signal from a pumped laser at a first position;
  providing means for modulating said first signal at said first position;
  generating a second signal from a remote laser beacon at a second position at the same wavelength as said first signal;
  providing means for detecting a signal at said second position;
  transmitting said second signal in a predetermined pattern from said second position;
  imputing said modulated first signal into a mutually pumped phase conjugation mirror (MPPCM) at the first position to establish a MPPCM beam fan field of view;
  providing means to allow the MPPCM beam fan to scan a predetermined field of view;

providing means for detecting a signal at said first position;

detecting the transmitted second signal at the first position;

establishing a two-way phase conjugated signal by uniting the first and second signal in the MPPCM so that each of the first and second signals generates simultaneously a temporally modulated phase conjugated return of the other of said first and second signals so that effecting lock-on;

modulating said first signal at said first position;

detecting said two-way phase modulated conjugation signal at said first and second positions, whereby a real-time optical communications link is established between both distinct positions allowing for the approximately immediate transferral of digital information with positive locational direction and identification of both distinct positions.

2. The universal IFF method of claim 1 wherein said second signal is modulated.

3. The universal IFF method of claim 2 wherein the modulation of said second signal is periodically varied to impress information which is transmitted as code.

4. The universal IFF method of claim 3 wherein the code can be updated or changed.

5. The universal IFF method of claim 1 wherein the modulation of said first signal is periodically varied to impress information which is transmitted as code.

6. The universal IFF method of claim 3 wherein the code can be updated or changed.

7. A universal identification of friend or foe (IFF) system utilizing a real-time communications link between two distinct positions to establish positive identification comprising:

a pumped laser for generating and transmitting a first signal from a first position;

modulation means for modulating said first signal;

a remote laser beacon at a second position for generating and transmitting a second signal at the same wavelength as said first signal;

first detecting means at said first position for detecting incoming signals from said second position;

second detecting means at said position for detecting incoming signals from said first position;

a mutually pumped phase conjugator mirror (MPPCM) which receives said first modulated signal as a first input signal to establish a beam fan field of view;

means to allow the MPPCM to scan a predetermined field of view, upon which, when said second signal is detected by the first detecting means, said second signal is received by the MPPCM as a second input signal to the MPPCM such that said first and second signals are united within the MPPCM and generates simultaneously a temporally modulated phase conjugated return of the other of said first and second signals in the MPPCM thereby effecting lock-on and establishing a two-way modulated phase conjugation signal which is detected at said first and second positions, so that a real-time optical communications link is established between both distinct parties allowing for the approximate immediate transferral of digital information with positive direction and identification of both distinct parties is achieved.

8. The universal IFF system of claim 7 wherein the MPPCM is a photorefractive crystal.

* * * * *